US012812042B2

(12) United States Patent
Ohira et al.

(10) Patent No.: US 12,812,042 B2
(45) Date of Patent: Nov. 24, 2026

(54) INFORMATION PROCESSING APPARATUS, PRODUCT, AND METHOD DISPLAYING RASTERIZED IMAGE GENERATED FROM PRINT DATA ON INSPECTION SETTING SCREEN

(71) Applicant: FUJIFILM Business Innovation Corp., Tokyo (JP)

(72) Inventors: Yoshie Ohira, Kanagawa (JP); Takashi Kikumoto, Kanagawa (JP); Shogo Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 37 days.

(21) Appl. No.: 17/967,148

(22) Filed: Oct. 17, 2022

(65) Prior Publication Data

US 2023/0401407 A1 Dec. 14, 2023

(30) Foreign Application Priority Data

May 23, 2022 (JP) ................................ 2022-083931

(51) Int. Cl.
*H04N 1/00* (2006.01)
*H04N 1/40* (2006.01)

(52) U.S. Cl.
CPC ..... *H04N 1/00015* (2013.01); *H04N 1/00045* (2013.01); *H04N 1/00074* (2013.01);
(Continued)

(58) Field of Classification Search
CPC .... H04N 1/00002–00092; H04N 1/387–3935; H04N 1/00408;
(Continued)

(56) References Cited

U.S. PATENT DOCUMENTS 7,224,821 B2 * 5/2007 Furukawa ............... G06T 7/001 382/141
7,317,548 B2 * 1/2008 Ishizuka ............ H04N 1/00427 358/1.18
(Continued)

FOREIGN PATENT DOCUMENTS

JP 2009-157858 A 7/2009
JP 2016-35418 A 3/2016
(Continued)

OTHER PUBLICATIONS

Mar. 31, 2026 Office Action issued in Japanese Patent Application No. 2022-083931.
(Continued)

*Primary Examiner* — Scott A Rogers
(74) *Attorney, Agent, or Firm* — Oliff PLC

(57) ABSTRACT

An information processing apparatus includes: a processor configured to: execute a displaying process for displaying, on a setting screen, an image obtained by rasterizing a page in print data; and execute a receiving process for receiving setting of at least one of an inspection target region serving as a target of an inspection or an inspection exception region to be excepted from the inspection, the setting being performed on the image displayed on the setting screen and received from a user.

11 Claims, 6 Drawing Sheets

(52) U.S. Cl.
CPC ....... *H04N 1/00411* (2013.01); *H04N 1/0044* (2013.01); *H04N 1/00482* (2013.01); *H04N 1/40068* (2013.01); *H04N 1/00029* (2013.01)

(58) Field of Classification Search
CPC ............. H04N 1/00411; H04N 1/0044; H04N 1/00474; H04N 1/00482; H04N 1/40068; G06K 15/027; G06K 15/1805; G06K 15/1836; G06K 15/1843; G06K 15/1882; G06F 3/1205; G06F 3/1253; G06F 3/1256; G06T 7/0002; G06T 7/0004; G06T 7/001; G06T 2207/30144; G06T 2207/30168
See application file for complete search history.

(56) References Cited

U.S. PATENT DOCUMENTS

| | | | | |
|---|---|---|---|---|
| 7,750,920 | B2 * | 7/2010 | Fejfar | G06F 3/14 345/428 |
| 8,503,030 | B2 * | 8/2013 | Goldwater | H04N 1/0044 358/1.9 |
| 8,553,260 | B2 * | 10/2013 | Goldwater | G06F 3/1205 358/1.9 |
| 8,817,292 | B1 * | 8/2014 | Rodriguez | G06F 3/1211 358/1.14 |
| 8,867,796 | B2 * | 10/2014 | Vans | H04N 1/00029 358/1.9 |
| 8,879,075 | B2 * | 11/2014 | Kitajima | G03G 15/502 358/1.11 |
| 9,727,805 | B2 * | 8/2017 | Yamagishi | H04N 1/0005 |
| 9,767,546 | B2 * | 9/2017 | Kojima | H04N 1/00034 |
| 10,402,961 | B2 * | 9/2019 | Fukase | G06T 7/001 |
| 10,404,868 | B2 * | 9/2019 | Spivakovsky | H04N 1/00037 |
| 11,580,632 | B2 * | 2/2023 | Iwano | H04N 1/00005 |
| 11,755,260 | B2 * | 9/2023 | Kashiwagi | G06F 3/1208 358/1.13 |
| 11,936,819 | B2 * | 3/2024 | Tsukamoto | H04N 1/00031 |
| 12,052,394 | B2 * | 7/2024 | Muraishi | H04N 1/00074 |
| 12,348,683 | B2 * | 7/2025 | Kikumoto | H04N 1/00023 |
| 12,363,234 | B2 * | 7/2025 | Azuma | G06F 3/1208 |
| 12,368,806 | B2 * | 7/2025 | Azuma | G06F 3/1234 |
| 2004/0150853 | A1 * | 8/2004 | Stodersching | G06F 3/1256 358/1.15 |
| 2019/0114759 | A1 * | 4/2019 | Azumai | G06T 7/74 |
| 2020/0096925 | A1 * | 3/2020 | Ikuta | G06F 3/1259 |
| 2020/0288030 | A1 * | 9/2020 | Tsukamoto | H04N 1/00803 |
| 2023/0100681 | A1 * | 3/2023 | Okada | H04N 1/00477 358/1.13 |
| 2023/0386019 | A1 * | 11/2023 | Tani | H04N 1/00015 |
| 2024/0037730 | A1 * | 2/2024 | Kasahara | G06T 7/001 |
| 2024/0073324 | A1 * | 2/2024 | Ichimi | H04N 1/00045 |
| 2024/0211184 | A1 * | 6/2024 | Ito | G06F 3/1208 |
| 2024/0380850 | A1 * | 11/2024 | Goto | H04N 1/00005 |
| 2025/0106326 | A1 * | 3/2025 | Yoshida | H04N 1/00087 |
| 2025/0301066 | A1 * | 9/2025 | Kikumoto | H04N 1/00461 |

FOREIGN PATENT DOCUMENTS

| | | |
|---|---|---|
| JP | 2020-067732 A | 4/2020 |
| JP | 2020-118501 A | 8/2020 |
| JP | 2020-145598 A | 9/2020 |
| JP | 2023-155532 A | 10/2023 |

OTHER PUBLICATIONS

Sep. 1, 2026 Office Action issued in Japanese Patent Application No. 2022-083931.

* cited by examiner

INFORMATION PROCESSING APPARATUS, PRODUCT, AND METHOD DISPLAYING RASTERIZED IMAGE GENERATED FROM PRINT DATA ON INSPECTION SETTING SCREEN

CROSS-REFERENCE TO RELATED APPLICATIONS

This application is based on and claims priority under 35 USC 119 from Japanese Patent Application No. 2022-083931 filed May 23, 2022.

BACKGROUND

(i) Technical Field

The present disclosure relates to an information processing apparatus, a non-transitory computer readable medium, and an information processing method.

(ii) Related Art

There are image inspection apparatuses that inspect the quality of the printing result of print data. The image inspection apparatuses use, as a reference image for the inspection, an image obtained by rasterizing the print data described in a page description language or the like. The image inspection apparatuses inspect whether the printing result has a defect such as a stain by comparing an image obtained by scanning the printing result with the reference image.

Among the existing image inspection apparatuses, there are image inspection apparatuses having not only a function of inspecting the entire range of the printing result but also a function of receiving the setting of a region to be inspected (hereinafter, referred to as an inspection target region) in the printing result and comparing only the region in the printing result with the corresponding region in the reference image. There are also apparatuses having a function of receiving the setting of a region to be excepted from the inspection (hereinafter, referred to as an inspection exception region) and inspecting a range other than the region in the printing result.

For example, since a stain or the like in a portion to be cut and discarded after the printing does not influence the quality of a final product, the portion is set as an exception to an inspection target. In a case where a preprinted sheet having a company logotype printed in advance is printed, the logotype portion is not included in the print data and thus is excepted from the printing target region.

To set an inspection target region or an inspection exception region in the image inspection apparatus, some coordinates that define the region (for example, in a case of a rectangular region, the coordinates of two apexes of the rectangle on its diagonal lines) are to be input. To date, to acquire the coordinates, test printing of print data is performed, and the printing result is actually measured with a scale or the like.

Examples of an apparatus for inspecting the quality of a printing result include an apparatus disclosed in Japanese Unexamined Patent Application Publication No. 2020-67732. The image inspection apparatus has an image inspection controller that inspects a printed material for anomaly by comparing a ground truth image prepared in advance with an image obtained by reading an image of the printed material. The image inspection controller generates ground truth images on the basis of combinations of pieces of information regarding the arrangement of a reused object in variable printing and a variable unique object. The image inspection controller generates the ground truth images by reading pieces of arrangement information regarding objects on all of pages.

SUMMARY

Aspects of non-limiting embodiments of the present disclosure relate to providing an apparatus enabled to set an inspection target region or an inspection exception region more simply and easily than by a method for measuring an actual printing result.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: execute a displaying process for displaying, on a setting screen, an image obtained by rasterizing a page in print data; and execute a receiving process for receiving setting of at least one of an inspection target region serving as a target of an inspection or an inspection exception region to be excepted from the inspection, the setting being performed on the image displayed on the setting screen and received from a user.

BRIEF DESCRIPTION OF THE DRAWINGS

An exemplary embodiment of the present disclosure will be described in detail based on the following figures, wherein.

DETAILED DESCRIPTION

Hereinafter, an embodiment for implementing the present disclosure (hereinafter, referred to as an exemplary embodiment) will be described with reference to the drawings.

An information processing apparatus of the exemplary embodiment has a function of receiving, from a user, region setting for an inspection of the printing result of a job. In the region setting, the setting of an inspection target region to be inspected and an inspection exception region to be excepted from the inspection or both is received. Hereinafter, the inspection target region and the inspection exception region are collectively referred to as an inspection-related region.

The term "inspection" herein includes an inspection of, for example, the quality of a printing result and the presence or absence of a defect such as a stain. An inspection for checking specific printing content in a page, for example, whether numerical values or barcode is correctly printed is also an example of the term "inspection" in this exemplary embodiment. If the inspection of the entire page is not required, an inspection-related region is set in any of the inspections.

To receive region setting for an inspection, the information processing apparatus displays the image of a page of a job on a setting screen presented to the user and receives the setting of one or more regions on the image.

Figure 1:
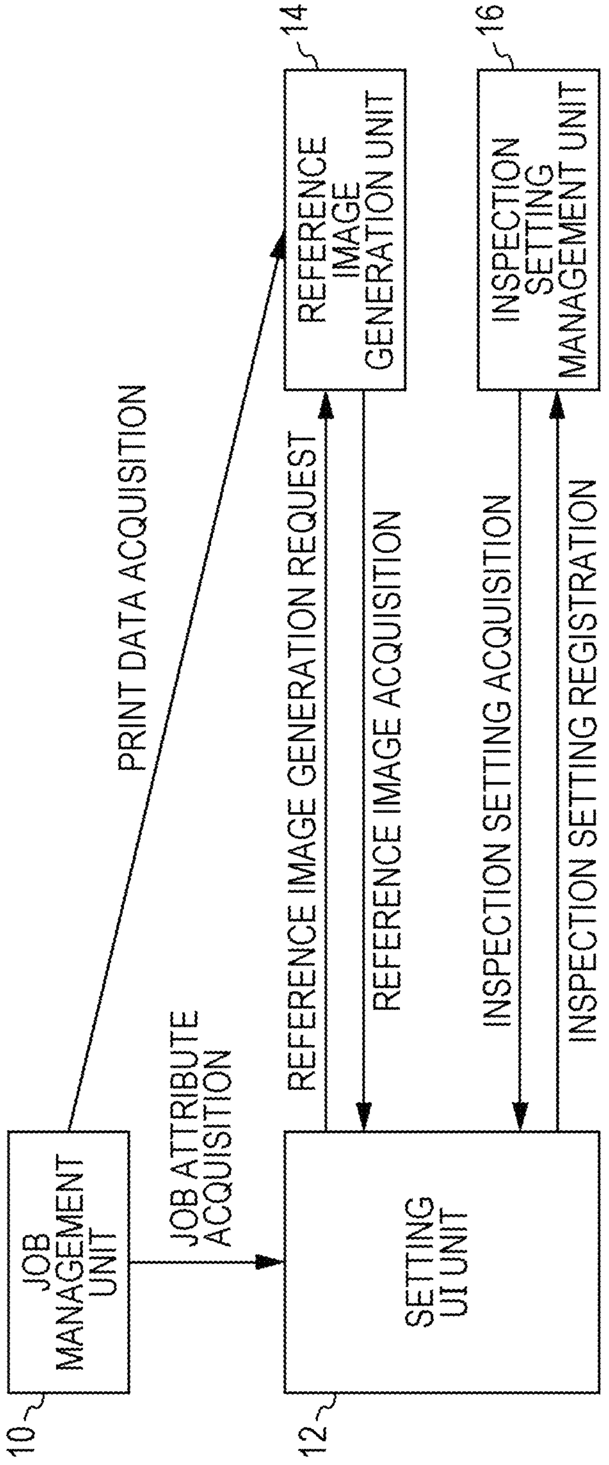
FIG. 1 is a diagram illustrating an example of the functional configuration of an information processing apparatus of the exemplary embodiment.

FIG. 1 illustrates the functional configuration of the information processing apparatus of the exemplary embodiment. The information processing apparatus is implemented, for example, by launching software for setting an inspection-related region installed on a general-purpose computer.

The information processing apparatus includes a job management unit 10, a setting UI unit 12, a reference image generation unit 14, and an inspection setting management unit 16.

The job management unit 10 manages the print data of a job registered by the user. The job management unit 10 manages, as one of pieces of attribute information of the job, identification information (for example, a file name) of an inspection setting file to be used for the inspection of the printing result of the job.

The setting UI unit 12 provides a setting screen serving as an UI for the region setting for the inspection. In this exemplary embodiment, the setting UI unit 12 displays, on the setting screen, an image obtained by rasterizing the page of the print data and uses the image as a reference image for the region setting. The user uses the reference image as a background to designate the range of an inspection-related region on the reference image displayed on the setting screen.

The reference image generation unit 14 generates the reference image to be displayed on the setting screen. Specifically, the reference image generation unit 14 rasterizes the print data described in a page description language and thereby generates the reference image that is a raster image.

The inspection setting management unit 16 manages an inspection setting file generated in response to input by the user by using the setting UI unit 12.

After the user designates a target job and instructs the information processing apparatus to display the setting screen for the region setting, the setting UI unit 12 acquires the attribute information of the designated job from the job management unit 10. If an inspection setting file has been registered for the designated job (for example, in a case where an inspection setting file has been generated for the inspection for the job in the past), the identification information of the registered inspection setting file is acquired when the attribute information is acquired. If the identification information of the inspection setting file is acquired, the setting UI unit 12 acquires the entity data of the inspection setting file indicated by the identification information from the inspection setting management unit 16. The acquired data is used when the already set inspection-related region is displayed on the setting screen. The user verifies the details of the already set inspection-related region and corrects the inspection-related region as occasion demands.

The setting UI unit 12 delivers the job ID of the designated job to the reference image generation unit 14 and requests the generation of a reference image for the job.

The reference image generation unit 14 transmits, to the job management unit 10, a data request including the job ID included in the request from the setting UI unit 12 and acquires the print data of the job indicated by the job ID from the job management unit 10. The received print data is, for example, data in the page description language. The reference image generation unit 14 generates an image in a raster form (that is, in a bitmap form) by rasterizing the print data. The reference image generation unit 14 then transmits the generated image as a reference image related to the request, to the setting UI unit 12 that has transmitted the request.

The setting UI unit 12 acquires the reference image transmitted from the reference image generation unit 14 and displays the setting screen displaying the reference image on the display connected to the information processing apparatus. If the setting UI unit 12 acquires an existing inspection setting file for the designated job from the inspection setting management unit 16, the setting UI unit 12 displays information regarding the inspection-related region indicated by the inspection setting file in such a manner as to superimpose the information on the reference image displayed on the setting screen.

The user sets an inspection-related region on the setting screen displayed by the setting UI unit 12. Since the reference image depicting the content of an image based on the print data is displayed as the background on the setting screen, the user designates, within the image, one or more ranges intended to be inspected and one or more ranges intended to be excepted from the inspection.

After completing the setting of the inspection-related region, the setting UI unit 12 registers an inspection setting file including the setting details with the inspection setting management unit 16. The setting details of the inspection-related region may be held as attribute information for the job but, in this example, is stored as an inspection setting file separate from the job. This helps the setting details to be reused for a different job. The setting UI unit 12 also executes a process for associating the generated inspection setting file with the job. How the association is performed is not particularly limited. For example, the association may be performed by setting, for the job, the identification information of the inspection setting file as one of pieces of attribute information. FIG. 1 corresponds to this example. In another example, for each inspection setting file, the inspection setting management unit 16 may manage information identifying the job to which the inspection setting file is applied.

Figure 2:
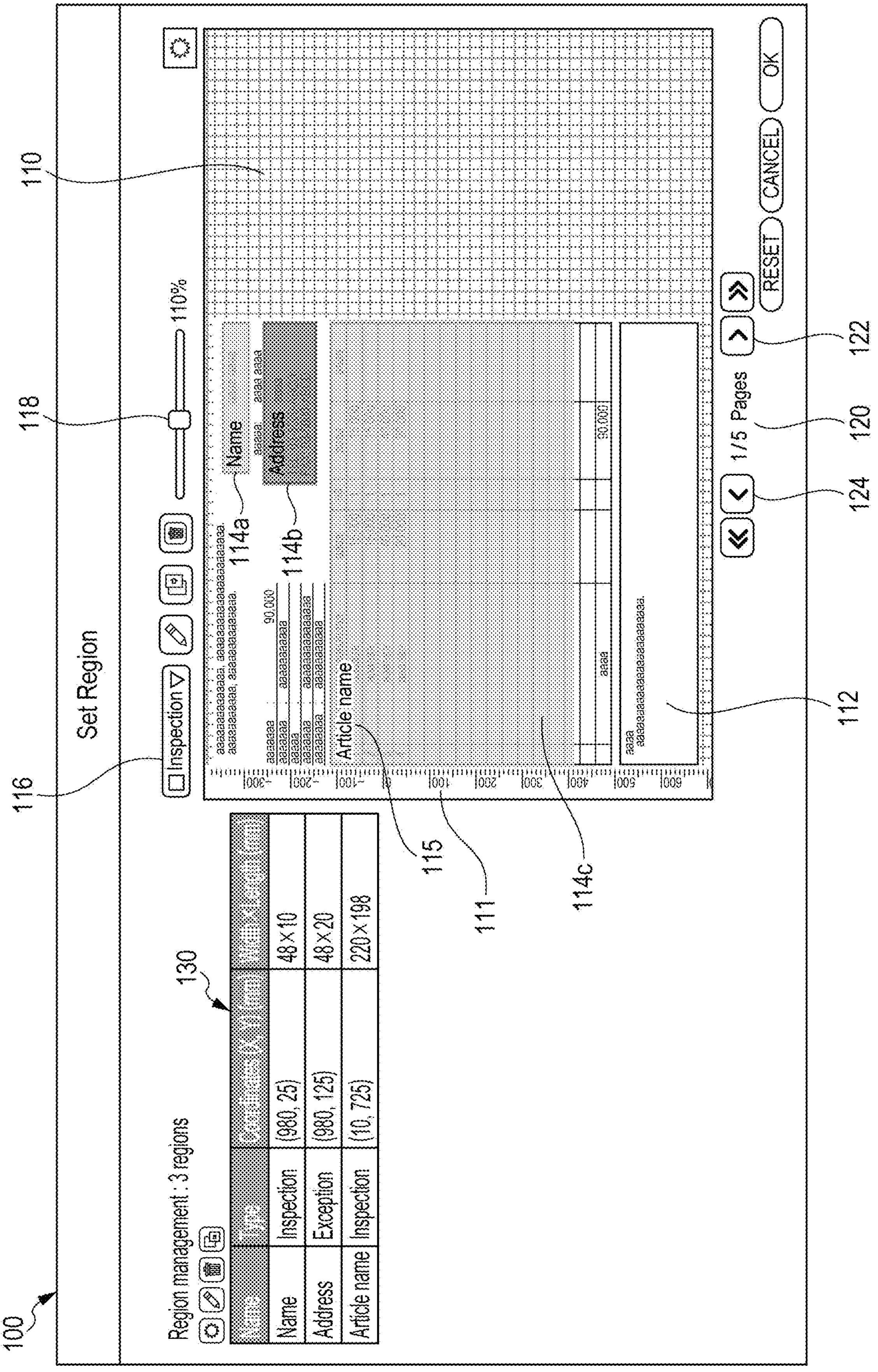
FIG. 2 is a view illustrating an example of a setting screen provided by the information processing apparatus.

FIG. 2 illustrates an example of a setting screen 100 displayed on the display by the setting UI unit 12. The setting screen 100 is configured as a window provided by the operating system of, for example, a computer serving as the information processing apparatus of this exemplary embodiment.

A region setting section 110 and a setting information display section 130 are displayed in the setting screen 100.

The region setting section 110 is a section for receiving the setting of an inspection-related region from the user. Mapping has been performed on the two-dimensional plane of the region setting section 110 as an image inspection target range. Scales 111 representing the horizontal and vertical coordinates of the two dimensional plane are displayed on the left end and the upper end of the region setting section 110. A grid composed of vertical and horizontal lines corresponding to the horizontal and vertical scales is also displayed in the region setting section 110 for a guide for a region setting operation.

In addition, a reference image 112 generated from the print data is displayed in the region setting section 110. The reference image 112 is displayed in such a manner as to be superimposed on the grid as the guide in the region setting section 110. The illustrated reference image is an image of an invoice. To set a rectangular inspection-related region composed of horizontal and vertical sides for designating the range of an inspection-related region on the reference image 112 in the region setting section 110 through a mouse operation, a touch operation, or the like, the user may perform, for example, the following operation. Specifically, the user moves the mouse cursor to one of points at the respective four corners of the region and thereafter selects the point by pressing the mouse button. The user moves the mouse while keeping pressing the mouse button to thereby move the mouse cursor to a point of the four corner points that is located on a diagonal line extending from the designated point, and then releases the mouse button.

In the example in FIG. 2, three regions 114*a*, 114*b*, and 114*c* (hereinafter, collectively referred to as a region 114 when discrimination is not required). The regions 114*a* and 114*c* of these are inspection target regions, and the region 114*b* is an inspection exception region. Each region 114 is displayed in an appropriate display form depending on the region type, that is, whether the region 114 is an inspection target region or an inspection exception region. In the illustrated example, the inspection target regions are filled with a first color, and the inspection exception region is filled with a second color different from the first color. The first color and the second color are both translucent colors, and the reference image 112 under the regions are seen through the regions. The display form indicating the region type is not limited to the form based on color and may be a different form (for example, a form based on monochrome density, or a hatching pattern on the region).

The setting UI unit 12 also receives an operation for changing the range of a region 114 displayed in the region setting section 110. In the operation, the user selects the region 114 to be changed, for example, by clicking with the mouse. The user then selects and drags an apex at one of the four corners of the selected region with the mouse and thereby changes the position of the apex. As occasion demands, the user changes the position of another apex. Through these operations, the position and the size of each selected region are changed.

A type selection section 116 is displayed above the region setting section 110. The type selection section 116 is a section for receiving selection of the type of a region to be set or an instruction to change the type. In the illustrated example, the type selection section 116 is formed as a toggle button, and a state indicating an inspection target region and a state indicating an inspection exception region are alternated every time the toggle button is pressed through a mouse operation or the like. For example, in response to the user setting a new region on the reference image 112 in the state where the type selection section 116 indicates the inspection exception region, the setting UI unit 12 determines that the region is an inspection exception region.

The setting UI unit 12 has a function of receiving the input of a name in the region 114 from the user. For example, in response to the user inputting a character string through a text input operation in the selected region 114, the setting UI unit 12 sets the character string as the name of the region 114 and displays the name in the region 114. For example, the region 114*c* is a section for displaying a list of articles in the invoice, and a name 115 representing "Article name" is set therefor. Note that setting the name for the region 114 is not necessarily required.

The setting UI unit 12 also receives an operation for changing the type of an existing region 114 superimposed on the reference image 112. As the changing operation, for example, the mouse cursor is positioned in the region 114, a context menu for the region is called by right-clicking or the like, and an item for type changing in the menu is selected.

In addition, a slider bar 118 for enlarging or reducing the region setting section 110 is displayed above the region setting section 110. Moving the slider on the slider bar 118 rightwards or leftwards through the mouse operation or the like causes the grid in the region setting section 110 and the reference image 112 superimposed thereon to be enlarged or reduced in a scale according to the slider position.

If the target print data has multiple pages, a page number section 120, a Next button 122, and a Previous button 124 are displayed below the region setting section 110. The number of the page serving as a current setting target on the region setting section 110 is displayed in the page number section 120. To change the setting target page, the user presses the Next button 122 or the Previous button 124 through the mouse operation or the like and thereby moves forward or back the number of the page displayed in the region setting section 110.

Information regarding each region 114 displayed in the region setting section 110 is displayed in the setting information display section 130. In the illustrated example, values for the items "name", "type", "reference point coordinates", and "size" for each of the regions 114*a*, 114*b*, and 114*c* displayed in the region setting section 110 are displayed in a list in the setting information display section 130. The reference point coordinates are the coordinates of a reference point (for example, the apex at the upper left corner) of the region. In the illustrated example, the reference point coordinates are expressed as "Coordinates (X, Y) (mm)" and represent the coordinates of the reference point in the coordinate system by using a unit of millimeters. In the coordinate system, a predetermined point (for example, the apex at the upper left corner of the sheet) is the origin. For example, the rightward direction is the positive direction of the X axis, and the downward direction is the positive direction of the Y axis. The size is a pair of widthwise and lengthwise dimensions of the region 114 and is expressed as "Width×Length (mm)" in FIG. 2.

In this example, the position and the size of the inspection-related region are expressed by using a unit of an absolute length that is millimeter, but this is merely an example. In another example, the position and the size of an inspection setting region may be expressed by using a unit of pixels of a raster image. In this case, information regarding the resolution of the region setting section 110 and the reference image displayed in the region setting section 110 is included in the setting information. In using the setting information for an inspection, the information regarding the resolution is used for the same scale for the inspection-related region and an image obtained by scanning the printing result.

If the resolution of a scanner used for the inspection is known, the resolution of the region setting section 110 and the reference image may be made identical to the resolution of the scanner. In this case, at the time of the inspection, the scale for the position and the size of the inspection-related region expressed by using pixels may be applied to the scanned image without matching the scales.

If a new region 114 is set in the region setting section 110, a new row having values of the name, the type, the reference point coordinates, and the size of the region 114 is added in the setting information display section 130. If the position or the size of the region 114 in the region setting section 110 is changed, information regarding the reference point coordinates or the size in the setting information display section 130 is changed in accordance with the change.

The setting screen 100 illustrated in FIG. 2 receives the setting of both of the inspection target region and the inspection exception region, but this is merely an example. The use of the setting screen 100 that receives the setting of only the inspection target region is conceivable, and the use of the setting screen 100 that receives the setting of only the inspection exception region is also conceivable.

An example of processing steps performed when the information processing apparatus displays the setting screen 100 will be described with reference to FIG. 3.

If the setting UI unit 12 receives an instruction to start setting an inspection-related region from the user, the setting UI unit 12 displays a screen for receiving the designation of a target job. The user designates the target job through an operation such as inputting a job ID on the screen or selecting a job from a job list referred to from the screen. Note that the setting may be started without designating a job.

The setting UI unit 12 determines whether the user designates a target job (S10). If the determination result is negative (N), that is, if a job is not designated, the setting UI unit 12 displays the setting screen 100 displaying the region setting section 110 without a reference image (S12). This is because the job has not been designated, and thus the image of the job is absent.

If the determination result in step S10 is affirmative (Y), that is, if a job is designated, the setting UI unit 12 requests the reference image generation unit 14 to generate a reference image. In response to this, the reference image generation unit 14 acquires, from the job management unit 10, information regarding the configuration of all pages of the job print data described, for example, in a page description language (S14). The reference image generation unit 14 then rasterizes each page by using the configuration information.

The setting UI unit 12 acquires an image of the rasterization result of each page from the reference image generation unit 14 (S18).

The setting UI unit 12 inquires of the job management unit 10 whether an inspection setting file has been designated for the job. The job management unit 10 determines whether an inspection setting file has been designated for the job (S20).

Examples of the case where an inspection setting file has been designated for the job include a case where the user has designated an inspection setting file in the past for the job and information regarding the designation has been stored in the inspection setting management unit 16. In another example of the case, in executing the job and the inspection this time, the user sets an inspection-related region for the job, and an inspection setting file is newly generated. In another example, in executing the job and the inspection this time, the user searches existing inspection setting files managed by the inspection setting management unit 16 for an inspection setting file applicable to the job this time and then designates a found inspection setting file for the job. In another example, the user modifies the found inspection setting file appropriately for the job this time and then designates, for the job, an inspection setting file having the modification reflected thereon.

If the determination result in step S20 is negative (N), the job management unit 10 makes a reply, to the setting UI unit 12, indicating that an inspection setting file has not been designated. In this case, the setting UI unit 12 displays, on the display, the setting screen 100 displaying the image acquired in step S18 as the reference image in the region setting section 110 (S22).

If the determination result in step S20 is affirmative (Y), the job management unit 10 delivers the inspection setting file to the setting UI unit 12, and the setting UI unit 12 acquires the inspection setting file (S24). The setting UI unit 12 then displays the setting screen 100 on the display, displays the reference image in the region setting section 110 in the setting screen 100, and superimposes the image of the inspection-related region described in the inspection setting file on the reference image (S26).

The setting UI unit 12 receives, from the user, an operation for setting the inspection-related region on the setting screen 100, generates setting information in accordance with the setting operation, and displays the setting information on the setting information display section 130.

For example, in step S26, the setting UI unit 12 receives an operation for changing the position and the size, the region type, the name, or the like of an existing inspection-related region described in the inspection setting file and displayed in the region setting section 110. The setting UI unit 12 also receives an operation for deleting an unnecessary region of the existing inspection-related regions and an operation for adding a new inspection-related region.

Figure 3:
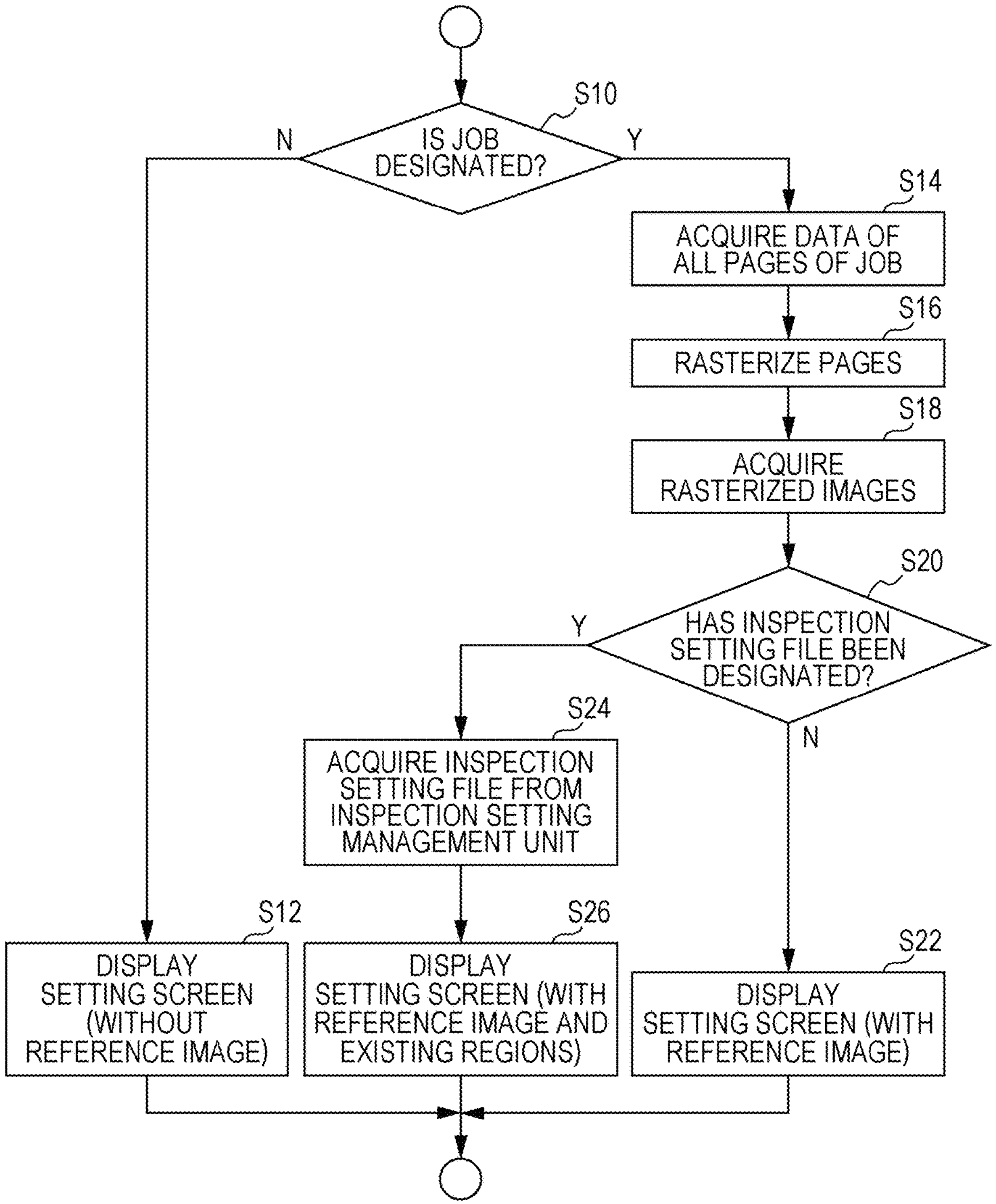
FIG. 3 is a flowchart illustrating an example of processing steps performed by the information processing apparatus.

If the setting UI unit 12 receives an instruction to store the setting information from the user, the setting UI unit 12 outputs the generated setting information to the inspection setting file; however, this is not illustrated in FIG. 3.

If it is determined in step S20 that an inspection setting file has been designated for the job, the setting UI unit 12 may prompt the user to select whether to overwrite the inspection setting file with the generated setting information or to generate a new inspection setting file. In this case, the setting UI unit 12 performs the overwriting or new inspection setting file generation in accordance with the selection by the user. Note that if the user is not authorized to write to the inspection setting file for the job found in step S20, the setting UI unit 12 generates a new inspection setting file without the overwriting and writes the setting information to the file.

Alternatively, if it is determined in step S20 that an inspection setting file has been designated for the job, the setting UI unit 12 newly generates an inspection setting file and setting information to the inspection setting file.

In the case where an inspection setting file is newly generated, the setting UI unit 12 performs a process for associating the inspection setting file with the job. The association is performed, for example, by writing the identification information of the newly generated inspection setting file in the attribute of the inspection setting file among pieces of attribute information of the job.

The setting UI unit 12 may also receive input of explanatory information regarding the inspection setting file from the user and register the explanatory information with the inspection setting management unit 16 in association with the inspection setting file. The explanatory information is information for explaining the characteristics of the job to which the inspection setting file is applied. When the inspection setting file applied to the job is generated, the user inputs explanation representing the characteristics of a document according to the job. Examples of the input explanation include information indicating the type of a document (such as an invoice or a shop flier) based on the job or supplementary information specific to the type (such as the issuance source of the invoice or the name of the shop). However, these are merely examples.

The setting UI unit 12 associates the input explanatory information with the inspection setting file, for example, in such a manner as to include the explanatory information as the attribute information in the inspection setting file. Note that the method for associating the explanatory information with the inspection setting file is not limited to this, and a different method may be used.

The explanatory information associated with the inspection setting file is used when the user searches for the inspection setting file to be used for the job. For example, the setting UI unit 12 has a function of searching pieces of explanatory information regarding inspection setting files managed by the inspection setting management unit 16. The setting UI unit 12 also displays explanatory information regarding an inspection setting file in response to an instruction from the user.

A modification will then be described. In this modification, multiple pieces of setting information regarding inspection-related regions are set for one job to thereby enable the pieces of setting information to be designated on a per page basis. Each piece of setting information is hereinafter referred to as an inspection pattern or simply and shortly as a pattern. For example, in the example illustrated in FIG. 2, the three regions 114 are set for the first page of a certain job, and the combination of the three regions 114 corresponds to a pattern assigned to the first page.

Figure 4:
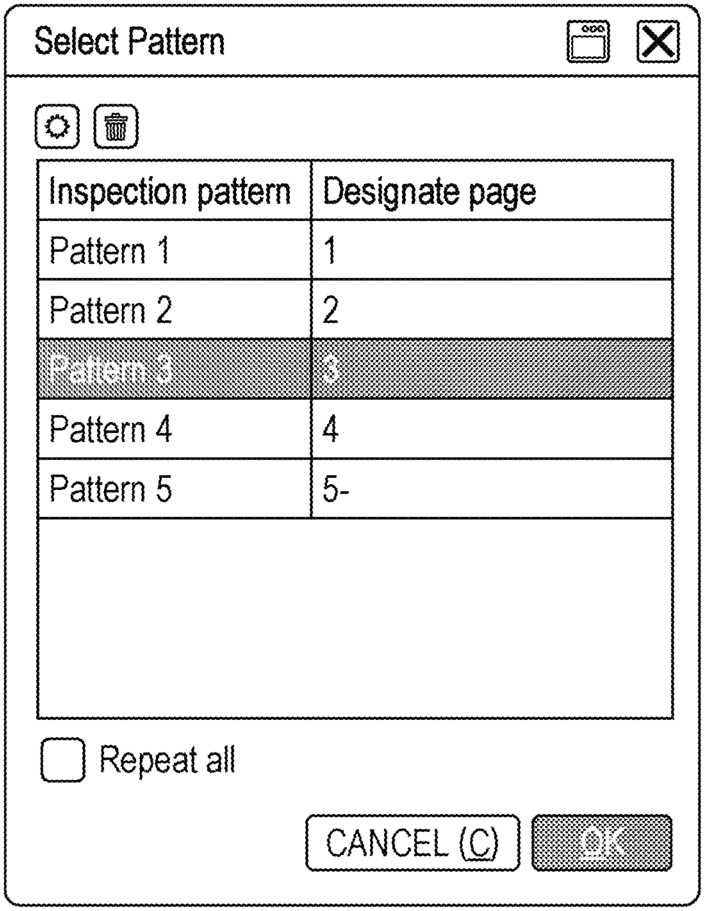
FIG. 4 is a view illustrating a user interface (UI) screen for assigning pieces of setting information (patterns) for inspection-related regions to respective pages of a job.

FIG. 4 illustrates an example of a UI screen 200 for assigning patterns to the pages of a job. A list having an inspection pattern column and a page designation column is displayed on the UI screen 200. In the inspection pattern column, pieces of identification information of the respective inspection patterns used for the job are displayed. In the page designation column, information for designating a page to which an inspection pattern is applied is input by the user. In the settings illustrated in FIG. 4, Patterns 1, 2, 3, and 4 are respectively applied to the first, second, third, and fourth pages of the job, and Pattern 5 is applied to the fifth page and following pages. The setting UI unit 12 receives the assignment of the inspection patterns to the respective pages of the job from the user by using the UI screen 200. Note that an inspection pattern is not assigned to a page not to be inspected. The pattern assignment information input by using the UI screen 200 is registered with the inspection setting management unit 16. For the pattern assignment information registered with the inspection setting management unit 16, the setting UI unit 12 may receive the designation of a job to which the information is applied. The inspection setting management unit 16 holds information indicating the association of each job with the pattern assignment information applied to the job.

An example of processing steps in which the information processing apparatus receives the settings of the multiple patterns from the user in this modification will be described with reference to FIG. 5. The same steps in FIG. 5 as those in FIG. 3 are denoted by the same reference numerals, and repeated explanation is omitted.

Figure 5:
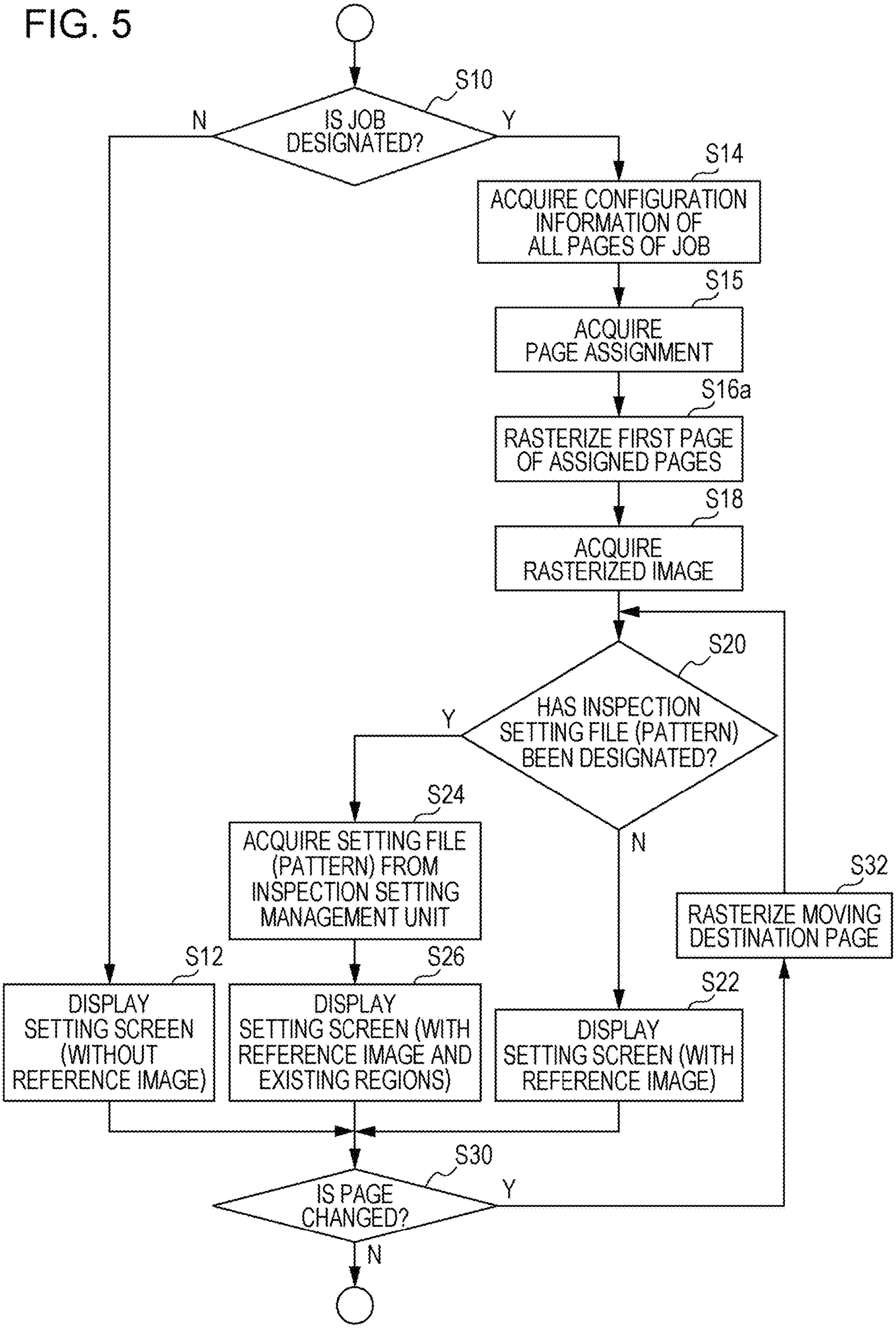
FIG. 5 is a flow chart illustrating an example of steps performed by the information processing apparatus when one or more inspection-related regions are set for multiple pages of a job.

In steps in FIG. 5, if the setting UI unit 12 determines in step S10 that a job to undergo region setting is designated, the setting UI unit 12 acquires data of all pages of the job in step S14. The setting UI unit 12 further acquires pattern assignment information for the job (see FIG. 4) from the inspection setting management unit 16 and holds the pattern assignment information in the working memory (S15). The setting UI unit 12 requests the reference image generation unit 14 to generate a reference image of a first page, that is, the page with the smallest number among the pages designated in the page designation column of the pattern assignment information. In response to the request, the reference image generation unit 14 rasterizes print data for the first page and generates the reference image of the page (S16*a*). In step S18, the setting UI unit 12 acquires the reference image of the page from the reference image generation unit 14.

If there is no pattern assignment information associated with the job, the setting UI unit 12 requests the reference image generation unit 14 to generate the reference image of the first page of the job in step S16*a* and acquires, in step S18, the reference image generated in response to the request.

The setting UI unit 12 then displays the reference image acquired in step S16*a* on the region setting section 110 of the setting screen 100 (either S22 or S24 and S26) and receives an operation for setting or changing an inspection-related region for the page from the user.

In step S20, the setting UI unit 12 determines whether a pattern has been assigned to the page in the pattern assignment information acquired in step S15. If the determination result is affirmative (Y), the setting UI unit 12 displays one or more inspection-related regions included in the pattern in such a manner as to superimpose the one or more inspection-related regions on the reference image 112 displayed on the region setting section 110. The setting UI unit 12 then receives an operation for changing or deleting any of the inspection-related regions, adding a new inspection-related region, or the like. In accordance with the operation by the user, the setting UI unit 12 changes data regarding the pattern in the working memory of the information processing apparatus. In response to the user giving an instruction to complete the setting for the page, the setting UI unit 12 writes the data regarding the pattern in the working memory to the inspection setting file. At this time, the setting UI unit 12 receives, from the user, an instruction as to whether the file of the existing pattern assigned to the page is to be overwritten with the data or a new inspection setting file is to be generated, and performs processing in accordance with the instruction. If the setting UI unit 12 newly generates an inspection setting file, the setting UI unit 12 changes, in the inspection pattern column in the pattern assignment information for the job in the working memory, the identification information of the pattern for the page determined in step S20 to the newly generated identification information of the inspection setting file.

Note that the pattern assignment information in the working memory is registered with the inspection setting management unit 16 at the time point when the user completes the settings for all the intended pages and gives an instruction to complete the processing in FIG. 5. At this time, whether to overwrite the existing pattern assignment information in the inspection setting management unit 16 (that is, the pattern assignment information acquired in step S15) or register the existing pattern assignment information as new pattern assignment information is decided on the basis of the instruction from the user or whether the user is authorized to write the existing pattern assignment information. If the pattern assignment information in the working memory is registered as the new pattern assignment information with the inspection setting management unit 16, the setting UI unit 12 further registers, with the inspection setting management unit 16, information indicating that the newly registered pattern assignment information is applied to the target job.

If it is determined that a pattern has not been assigned to the target page in step S20, the setting UI unit 12 displays, on the region setting section 110, the reference image 112 without the inspection-related region superimposed thereon, in step S22. The setting UI unit 12 generates setting information (that is, a pattern) in the working memory in accordance with an operation performed by the user on the region setting section 110, generates a new inspection setting file when the setting for the page is completed, and writes the setting information to the inspection setting file. The setting UI unit 12 registers the inspection setting file with inspection setting management unit 16. The setting UI unit 12 also adds a row for the pattern indicated by the inspection setting file in the pattern assignment information in the working memory and adds the page number of the target page in the field in the row and in the page designation column.

After the setting of the region on the setting screen 100 displayed in step S12, S22, or S26, the user performs, on the setting screen 100, an operation for indicating that the setting for the page being set is completed. Examples of the operation include an operation for pressing the Next button 122 or the Previous button 124 in the setting screen 100 illustrated in FIG. 2. A button for an instruction to complete the setting of an inspection-related region for the page may be provided in the setting screen 100; however, this is not illustrated in FIG. 2. In this case, the operation by which the user presses the button is the operation indicating that the setting for the page is completed.

The setting screen 100 may include a graphical user interface (GUI) component such as a button for receiving the operation indicating the completion of the setting of the inspection-related region for the job, but this is not illustrated in FIG. 2.

After the setting for the page is completed, the setting UI unit 12 determines whether to move the region setting target to a different page (S30). If the user presses the Next button 122 or the Previous button 124, the determination result in step S30 is affirmative (Y). If the pattern assignment information acquired in step S15 includes a pattern assigned to a page following the page for which the current setting is completed, the determination result in step S30 is also affirmative (Y).

If the determination result in step S30 is affirmative (Y), the setting UI unit 12 requests the reference image generation unit 14 to generate the reference image of the moving destination page and acquires the reference image generated by the reference image generation unit 14 in response to the request (S32).

If the page moving is attributable to the pressing of the Next button 122 or the Previous button 124, the setting UI unit 12 requests, in step S32, the reference image generation unit 14 to generate the reference image of the page serving as the destination of moving caused by the pressing. At this time, the setting UI unit 12 stores the pattern for the page in the pattern assignment information as an assigned pattern.

If the user gives an instruction to complete the setting for the page, the setting UI unit 12 also stores the pattern for the page in the pattern assignment information as an assigned pattern. If the pattern assignment information includes one or more unassigned patterns, the setting UI unit 12, in step S32, requests the reference image generation unit 14 to generate the reference image of the page having the smallest page number of pages designated for the one or more unassigned patterns. The setting UI unit 12 thereafter repeats step S20 and following steps for the moving destination page.

As described above, in steps in FIG. 5, all pages of the print data are not collectively rasterized, but only a page required to be displayed on the setting screen 100 is rasterized. If need for displaying a different page arises, the different page is rasterized.

If the user instructs the setting UI unit 12 to complete the setting for the job, the determination result in step S30 is negative (N). In this case, the setting UI unit 12 registers, with the inspection setting management unit 16, pattern assignment information in the working memory that has been, for example, added, deleted, or changed by the user and data regarding the pattern.

After generating multiple patterns required for the inspection of the printing result of the job in accordance with the steps in FIG. 5, the setting UI unit 12 may display the UI screen 200 illustrated in FIG. 4 and receive, from the user, the designation or the change of the designation of a page to which a pattern is applied. At the time point of displaying the UI screen 200 immediately after the completion of the steps in FIG. 5, the number of the page corresponding to the reference image used as the background for generating the pattern in the steps in FIG. 5 has been registered in the field for the pattern in the page designation column in the UI screen 200. The user verifies the information regarding the pattern application target page displayed in the field in the page designation column from the UI screen 200 in this state and modifies the information in the field as occasion demands.

An inspection setting file generated by the information processing apparatus of this exemplary embodiment is used by an inspection apparatus that inspects the printing result of a job output by a printer. The inspection apparatus inspects an image obtained by scanning the printing result. In the inspection, the inspection apparatus refers to an inspection setting file associated with the job.

If an inspection target region is set but an inspection exception region is not set in the setting information stored in the inspection setting file, the inspection apparatus inspects an image of a portion corresponding to the inspection target region in the image of the scanning result and does not inspect the image of a portion not belonging to any inspection target region. If an inspection exception region is set but an inspection target region is not set in the setting information, the inspection apparatus does not inspect the image of a portion corresponding to the inspection exception region in the image of the scanning result and inspects the image of a portion not belonging to any inspection exception region. If both of the inspection target region and the inspection exception region are set in the setting information, the inspection apparatus performs an inspection by combining the method for the case where only the inspection target region is set and the method for the case where only the inspection exception region is set. If an inspection exception region is set within the inspection target region, a portion corresponding to the inspection exception region is not inspected. If the inspection target region is set within the inspection exception region, the inspection target region is inspected.

The information processing apparatus of this exemplary embodiment may have one or more of functions of an apparatus that controls the printing of a job and an inspection apparatus that inspects the result of the printing.

An example of generating an inspection setting file used for an inspection of the result of printing of a preprinted sheet will be described.

A preprinted image such as a company logotype is printed in advance on the preprinted sheet. After printing on the preprinted sheet, an image represented by the print data and the preprinted image are depicted on the preprinted sheet.

The preprinted image on the preprinted sheet has no relationship with the quality or the like of the printing based on the job in many cases. Excepting a region corresponding to the preprinted image from the target of the inspection is thus conceivable. However, the reference image displayed on the setting screen in the exemplary embodiment above is obtained by rasterizing the print data and thus does not include the preprinted image. Accordingly, it is difficult to use the reference image as the background to assist the user in designating a region corresponding to the preprinted image as, for example, the inspection exception region.

Hence, in this example, the reference image generation unit 14 receives the input of an image on the preprinted sheet and generates a reference image by synthesizing the image on the preprinted sheet with a raster image obtained by rasterizing the print data. The image on the preprinted sheet may be obtained, for example, by scanning the preprinted sheet or by rasterizing the print data of a page of the preprinted sheet. The user inputs data of the thus obtained image on the preprinted sheet in the information processing apparatus by using, for example, an input function provided by the setting UI unit 12 for preprinting information. The reference image generation unit 14 synthesizes the data of the input image of the preprinted sheet with the raster image generated from the print data of the job and thereby generates the reference image.

Figure 6:
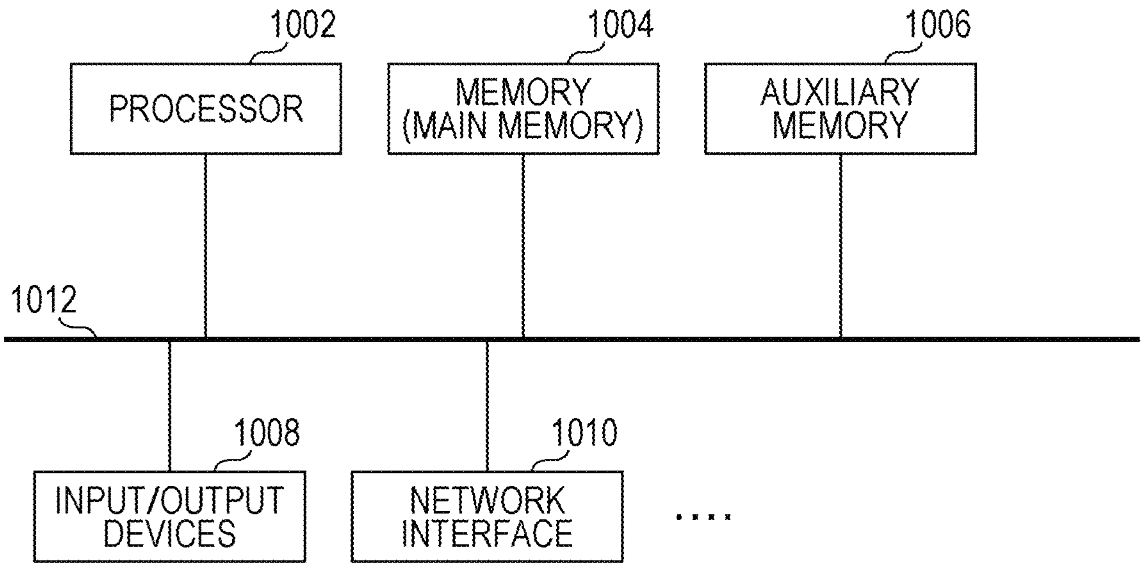
FIG. 6 is a diagram illustrating the hardware configuration of a computer.

The information processing apparatus of the exemplary embodiment above is configured by using, for example, a general-purpose computer. As illustrated in FIG. 6, the computer has, for example, a circuit configuration in which a controller that controls a processor 1002, a memory (main memory) 1004 such as a random-access memory (RAN), and an auxiliary memory 1006 that is a nonvolatile memory such as a flash memory, a solid state drive (SSD), or a hard disk drive (HDD), an interface with various input/output devices 1008, a network interface 1010 that performs control for connection to a network such as a local area network, and other components are connected via a data transmission path such as a bus 1012. A program describing the details of the processing in the exemplary embodiment above is installed on the computer through a network or the like and stored in the auxiliary memory 1006. The program stored in the auxiliary memory 1006 is run by the processor 1002 by using the memory 1004, and thereby the information processing apparatus of this exemplary embodiment is implemented.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

(Appendix)

(1)))

An information processing apparatus including:

a processor configured to:

execute a displaying process for displaying, on a setting screen, an image obtained by rasterizing a page in print data; and execute a receiving process for receiving setting of at least one of an inspection target region serving as a target of an inspection or an inspection exception region to be excepted from the inspection, the setting being performed on the image displayed on the setting screen and received from a user.

(((2)))

In the information processing apparatus according to (((1))), the processor is configured to:

output setting information indicating a detail of the setting of each of the inspection target region and the inspection exception region to an inspection setting file separate from the print data, the setting being received in the receiving process.

(((3)))

In the information processing apparatus according to (((2))), the processor is configured to:

receive input of explanatory information regarding the inspection setting file from the user; and associate the explanatory information with the inspection setting file.

(((4)))

In the information processing apparatus according to (((1))), the processor is configured to:

generate multiple pieces of setting information indicating a detail of the setting of each of the inspection target region and the inspection exception region, the multiple pieces of setting information being generated by executing the displaying process and the receiving process for each of one or more pages in the print data, the one or more pages being designated from the user; and receive, from the user, designation of each of the multiple pieces of setting information that is to be assigned to a corresponding one of the pages in the print data.

(((5)))

In the information processing apparatus according to (((1))), the processor is configured to:

every time designation of the page in the print data is received, execute the displaying process and the receiving process for the page.

(((6)))

In the information processing apparatus according to (((1))), the processor is configured to:

rasterize the page in the displaying process with a resolution lower than a resolution of an image generated when the print data is printed.

(((7)))

In the information processing apparatus according to (((6))), the resolution lower than the resolution of the image generated when the print data is printed is identical to a resolution of a scanner used for the inspection.

(((8)))

In the information processing apparatus according to (((1))), the processor is configured to:

display, on the setting screen in the displaying process, an image obtained by synthesizing an image of a preprinted sheet with the image obtained by rasterizing the page in the print data.

(((9)))

A program including:

executing execute a displaying process for displaying, on a setting screen, an image obtained by rasterizing a page in print data; and executing a receiving process for receiving setting of at least one of an inspection target region serving as a target of an inspection or an inspection exception region to be excepted from the inspection, the setting being performed on the image displayed on the setting screen and received from a user.

What is claimed is:

1. An information processing apparatus comprising:

a processor configured to:

execute a displaying process for displaying, on a setting screen, a rasterized image generated from print data corresponding to a page, the rasterized image not being derived from a scanned image of a sheet printed from the print data;

execute a receiving process for receiving setting of at least one of an inspection target region serving as a target of an inspection or an inspection exception region to be excepted from the inspection, the setting being performed on the rasterized image displayed on the setting screen and the setting being received from a user; and display, on the setting screen in the displaying process, an image obtained by synthesizing an image of a preprinted sheet with the rasterized image generated from the print data corresponding to the page.

2. The information processing apparatus according to claim 1, wherein the processor is configured to:

output setting information indicating a detail of the setting of each of the inspection target region and the inspection exception region to an inspection setting file separate from the print data, the setting being received in the receiving process.

3. The information processing apparatus according to claim 2, wherein the processor is configured to:

receive input of explanatory information regarding the inspection setting file from the user; and associate the explanatory information with the inspection setting file.

4. The information processing apparatus according to claim 1, wherein the processor is configured to:

generate a plurality of pieces of setting information indicating a detail of the setting of each of the inspection target region and the inspection exception region, the plurality of pieces of setting information being generated by executing the displaying process and the receiving process for each of one or more pages in the print data, the one or more pages being designated by the user; and receive, from the user, designation of each of the plurality of pieces of setting information that is to be assigned to a corresponding one of the pages in the print data.

5. The information processing apparatus according to claim 1, wherein the processor is configured to:

every time designation of the page in the print data is received, execute the displaying process and the receiving process for the page.

6. The information processing apparatus according to claim 1, wherein the processor is configured to:

rasterize the page in the displaying process with a resolution lower than a resolution of an image generated when the print data is printed.

7. The information processing apparatus according to claim 6, wherein the resolution lower than the resolution of the image generated when the print data is printed is identical to a resolution of a scanner used for the inspection.

8. The information processing apparatus according to claim 1, wherein the processor is configured to generate the rasterized image by rasterizing the print data described in a page description language, the print data corresponding to the page.

9. A non-transitory computer readable medium storing a program causing a computer to execute a process comprising:

executing a displaying process for displaying, on a setting screen, a rasterized image generated from print data corresponding to a page, the rasterized image not being derived from a scanned image of a sheet printed from the print data;

executing a receiving process for receiving setting of at least one of an inspection target region serving as a target of an inspection or an inspection exception region to be excepted from the inspection, the setting being performed on the rasterized image displayed on the setting screen and the setting being received from a user; and displaying, on the setting screen in the displaying process, an image obtained by synthesizing an image of a preprinted sheet with the rasterized image generated from the print data corresponding to the page.

10. An information processing method comprising:

executing a displaying process for displaying, on a setting screen, a rasterized image generated from print data corresponding to a page, the rasterized image not being derived from a scanned image of a sheet printed from the print data;

executing a receiving process for receiving setting of at least one of an inspection target region serving as a target of an inspection or an inspection exception region to be excepted from the inspection, the setting being performed on the rasterized image displayed on the setting screen and the setting being received from a user; and displaying, on the setting screen in the displaying process, an image obtained by synthesizing an image of a preprinted sheet with the rasterized image generated from the print data corresponding to the page.

11. An information processing apparatus comprising:

a processor configured to:

execute a displaying process for displaying, on a setting screen, an image obtained by rasterizing a page in print data;

execute a receiving process for receiving setting of at least one of an inspection target region serving as a target of an inspection or an inspection exception region to be excepted from the inspection, the setting being performed on the image displayed on the setting screen and the setting being received from a user;

generate a plurality of pieces of setting information indicating a detail of the setting of each of the inspection target region and the inspection exception region, the plurality of pieces of setting information being generated by executing the displaying process and the receiving process for each of one or more pages in the print data, the one or more pages being designated by the user; and receive, from the user, designation of each of the plurality of pieces of setting information that is to be assigned to a corresponding one of the pages in the print data.

* * * * *